United States Patent
Winner et al.

(10) Patent No.: US 6,763,904 B2
(45) Date of Patent: Jul. 20, 2004

(54) METHOD FOR ADJUSTING THE SPEED OF A MOTOR VEHICLE

(75) Inventors: Hermann Winner, Karlsruhe (DE); Jens Lueder, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,149

(22) PCT Filed: Mar. 31, 2001

(86) PCT No.: PCT/DE01/01276
§ 371 (c)(1),
(2), (4) Date: Apr. 4, 2002

(87) PCT Pub. No.: WO01/79882
PCT Pub. Date: Oct. 25, 2001

(65) Prior Publication Data
US 2003/0070851 A1 Apr. 17, 2003

(30) Foreign Application Priority Data
Apr. 14, 2000 (DE) .......................... 100 18 556

(51) Int. Cl.⁷ ............................... B62D 6/00
(52) U.S. Cl. .................. 180/167; 180/169; 701/96; 348/148
(58) Field of Search ............... 180/167, 168, 180/169; 701/96; 348/148

(56) References Cited

U.S. PATENT DOCUMENTS

| | | | |
|---|---|---|---|
| 5,402,129 A | | 3/1995 | Gellner et al. |
| 5,467,283 A | * | 11/1995 | Butsuen et al. ............. 364/461 |
| 5,754,099 A | * | 5/1998 | Nishimura et al. ......... 340/435 |
| 5,786,787 A | * | 7/1998 | Eriksson et al. ............. 342/70 |
| 5,964,822 A | * | 10/1999 | Alland et al. ............... 701/301 |
| 6,202,027 B1 | * | 3/2001 | Alland et al. ............... 701/301 |
| 6,230,093 B1 | * | 5/2001 | Michi et al. .................. 701/96 |
| 6,269,308 B1 | * | 7/2001 | Kodaka et al. ............. 701/301 |
| 6,292,752 B1 | * | 9/2001 | Franke et al. .............. 701/300 |
| 6,301,542 B1 | * | 10/2001 | Kirchberger et al. ......... 701/93 |
| 6,311,120 B1 | * | 10/2001 | Asada ......................... 701/96 |
| 6,317,679 B2 | * | 11/2001 | Sielagoski et al. ........... 701/96 |
| 6,363,311 B1 | * | 3/2002 | Kuroda et al. ................ 701/96 |
| 6,466,863 B2 | * | 10/2002 | Shirai et al. ................ 701/200 |
| 6,473,685 B2 | * | 10/2002 | Kuroda et al. ................ 701/96 |
| 6,554,090 B1 | * | 4/2003 | Kuroda et al. ............... 180/170 |
| 6,560,525 B1 | * | 5/2003 | Joyce et al. .................. 701/96 |
| 6,600,986 B2 | * | 7/2003 | Steinle et al. ................. 701/70 |
| 6,643,588 B1 | * | 11/2003 | Ibrahim ...................... 701/301 |

FOREIGN PATENT DOCUMENTS

| | | |
|---|---|---|
| DE | 42 42 700 | 6/1994 |
| DE | 197 22 947 | 2/1999 |

* cited by examiner

Primary Examiner—Brian L. Johnson
Assistant Examiner—Jeffrey Restifo
(74) Attorney, Agent, or Firm—Kenyon & Kenyon

(57) ABSTRACT

A method for controlling the speed of a vehicle is proposed, where, in the vehicle to be controlled, the yaw rate or rotation rate is measured, in particular to determine the curvature of the vehicle's own travel trajectory, and where, using a proximity sensor or position sensor, at least one vehicle traveling ahead or at least some other object within a sensor's sensing range is detected, particularly with regard to an offset from the travel course of the vehicle to be controlled. By delaying the travel-course offset of a vehicle driving ahead, determined in preset measuring cycles, by a predefined time span, and by using the then instantaneous curvature of the travel trajectory, a historical travel-course offset is ascertained, one is able to simply and rapidly predict the travel course of the vehicle to be controlled.

20 Claims, 3 Drawing Sheets

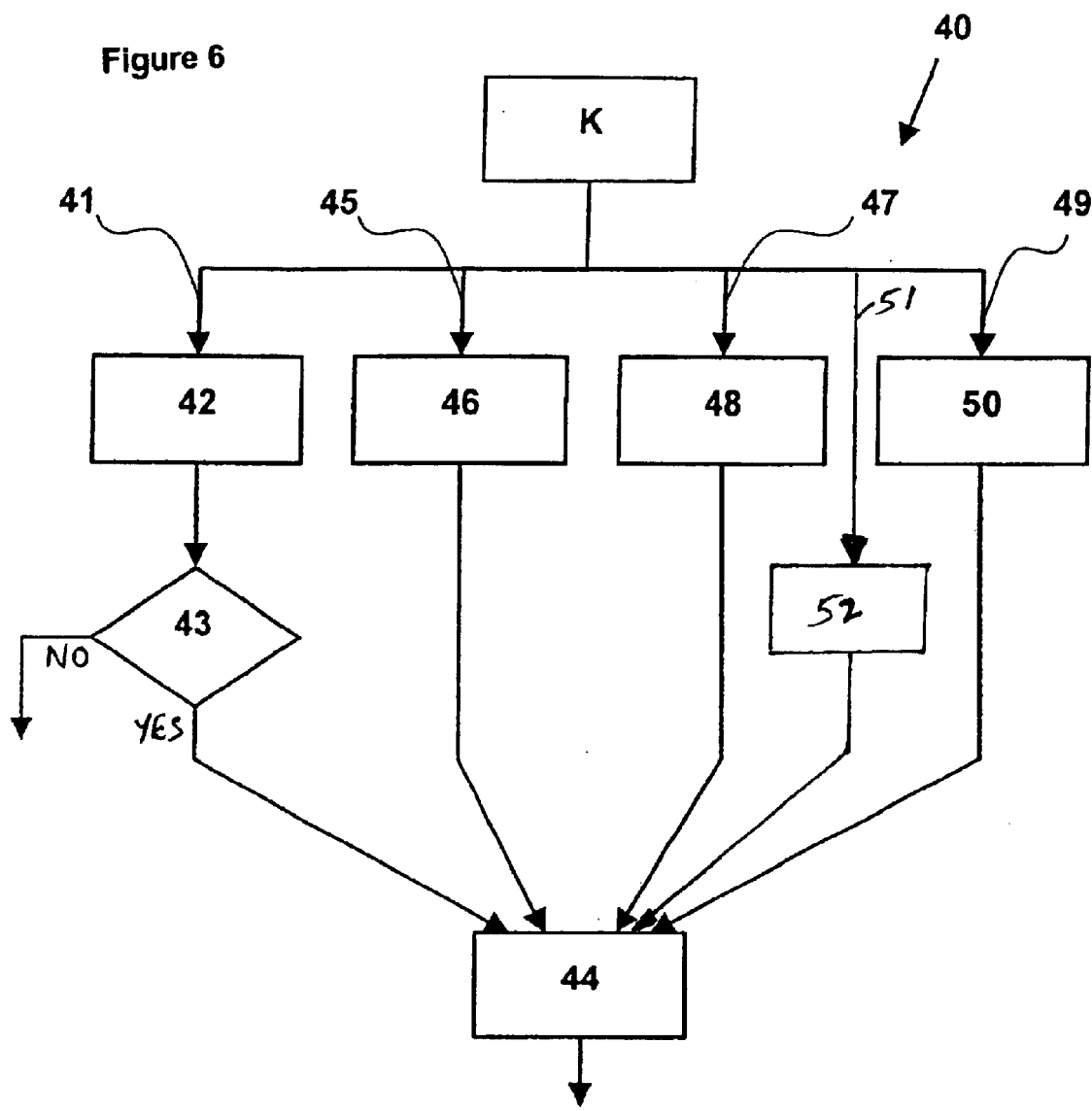

METHOD FOR ADJUSTING THE SPEED OF A MOTOR VEHICLE

FIELD OF THE INVENTION

The present invention relates to a method for controlling the speed of a vehicle, particularly under consideration of vehicles driving ahead.

BACKGROUND INFORMATION

From German Published Patent Application No. 42 42 700, it is known to mount a radar or infrared sensor on a vehicle to detect vehicles driving ahead. This radar sensor can be, for example, a module of a vehicle comfort and convenience system ACC (adaptive cruise control), in which information pertaining to the distance and the relative speed of the vehicle with respect to other vehicles and information on road conditions are continually processed.

The basic functions of the above described system relate to the control of the vehicle speed, either to a setpoint value, here the desired speed, or to the speed of a vehicle driving ahead, in the case that the latter is traveling at a slower speed than the desired speed and is within the sensing range of the radar sensor. As mentioned above, this sensor can be, for example, a component of a microwave radar or of an infrared lidar and, to that end, it measures the distance, the relative speed, and the angle of objects, particularly of vehicles driving ahead within the sensing range.

From German Patent No. 197 22 947, a method is known, where, in addition to measuring the quantities described above, the ACC system also includes the future travel-course progression of the vehicle, along with the ACC system, in the control in order to determine the future travel corridor. For this, the future travel-course range of at least one vehicle driving ahead is determined, and a lateral offset is then ascertained for all detected vehicles. Given steady-state curvature conditions of the roadway, i.e., in a linear portion or in the region of constant curvature of a curve, the future travel corridor is also able to be easily determined using the known method, with the aid of a well-adjusted yaw-rate or rotation-rate signal.

From the yaw rate of the ACC vehicle, the curvature of the roadway and, therefore, also the travel-course offset of a vehicle traveling ahead can be determined here, using generally known method steps. If this travel-course offset is smaller in terms of absolute value than a predefined width of the travel corridor, then one can infer that the vehicle traveling ahead is located in the travel corridor of the ACC vehicle. When working with changing conditions, particularly in the beginning curve region, however, one is normally no longer able to correctly determine the association with the travel corridor, so that it can happen that a vehicle driving ahead in the right, adjacent lane, near the beginning of a left curve, is incorrectly attributed to the travel corridor. This leads to faulty control reactions, the cause here being the mistaken curvature prediction, since the ascertained curvature is always specific to the current instant and, therefore, the reaction to a change in curvature is always too late.

SUMMARY OF THE INVENTION

A method for controlling the speed of a vehicle of the type mentioned at the outset, where, in the vehicle to be controlled, the yaw rate or rotation rate is measured, in particular to determine the curvature of the vehicle's own travel trajectory, and where, using a proximity sensor or position sensor, at least one vehicle traveling ahead or at least some other object within a sensor's sensing range is detected with regard to an offset from the travel course of the vehicle to be controlled, is advantageously further refined in accordance with the present invention.

As already mentioned at the outset, curvature k of the roadway may be calculated in a simple manner from the measured yaw rate of the ACC vehicle to be controlled using generally known method steps in that the yaw rate is divided by the speed, and, using that, the travel-course offset ye of a vehicle traveling ahead may also be determined. Specifically, travel-course offset yc may by determined by the following formula:

$$yc = yv - k*d^2/2,$$

quantity yv being the measured lateral offset, without allowing for curvature k, and d being the distance between the vehicle to be controlled and the measured vehicle driving ahead.

If this travel-course offset yc is smaller in terms of absolute value than a predefined width $y_{lane}$, then one may infer that the object or the vehicle is located in the travel corridor of the ACC vehicle, $y_{lane}$ corresponding approximately to one half of a lane width.

In accordance with the present invention, travel-course offset yc of a vehicle driving ahead, determined in preset measuring cycles, is delayed by a predefined time lag, and using the instantaneous curvature k of the travel trajectory of the vehicle to be controlled, a historical travel-course offset $yc_{hist}$ is ascertained. In this context, the delay may advantageously be selected such that historical travel-course offset $yc_{hist}$ is determined after approximately half of the distance between the vehicle to be controlled and the measured vehicle.

Therefore, alternatively to the generally known method of looking ahead using video-based lane detection or navigational systems, the method according to the present invention for controlling an ACC vehicle permits, in a simple manner, a relatively fast and simple-to-implement historical comparison between the position and travel trajectory of the vehicles. Instead of a costly, continuous transformation of the measured data, the present invention provides, in simplified fashion, for measured lateral offset yv to be delayed by about time span $t_{hist}$, commensurate with half of the time span between the vehicles.

From this so delayed value $yv_{hist}$, as above, using active curvature k, the so-called historical travel-course offset $yc_{hist}$ is now determined in accordance with the relation:

$$yc_{hist} = yv_{hist} - k*d_{hist}^2/2$$

$d_{hist}$ being generated or estimated, likewise on the basis of a delay, as the historical distance between the vehicle to be controlled and the measured vehicle. For example, in accordance with the relation $$d_{hist} = d_{active} - vr*t_{hist}.$$

Thus, distance $d_{hist}$ takes into consideration the change in distance in response to speed differences. In illustrative terms, the mechanism functions as follows: the curvature determination is made approximately at the middle of the distance between the ACC vehicle and the measured object, although delayed by $t_{hist}$. Even when working with changing curvatures, the average curvature is a good estimation here and allows a quite precise determination of travel-course offset.

To avoid unwanted transient effects in those cases where the object had not yet been measured for the length of time span thist and, consequently, no historical lateral offsets exist, it is advantageous when a dynamically increasing delay time $t_{hist/dyn}$ takes the place of time $t_{hist}$, the time span until maximum value $t_{hist}$ is reached being supplemented by the dynamic component that increases with the duration of observation. Until this maximum value is reached, the quality of the thus calculable $yc_{hist}$ is somewhat lower, but this value is always ready as a transitional value.

In addition, a filtering is advantageous to compensate for short-term curvature fluctuations caused by steering motion or signal noise. Since this filtering likewise delays the active signal by $t_{filter}$, the delay in the yv values must likewise last longer by approximately this value. The delay may be advantageously further modified, for example, by filter times of active curvature signal k. In this connection, the instantaneous value of curvature k of the travel trajectory of the vehicle to be controlled, at any one time, is delayed by a preset value for averaging purposes, this delay being considered as well in the determination of historical travel-course offset $yc_{hist}$.

Although the delay times are known, so that $t_{hist}$ is generated from the sum of half of the time gap and the filter time, such modifications of time span $t_{hist}$ may be useful in order to achieve a functional optimum by way of a total adjustment. This applies, in particular, when the quantities are not only filtered by a delay element, but are also averaged via low-pass-type filters. The latter is also used here for reducing measuring fluctuations. Delay element and averaging filter may be combined in simple fashion, for example, by using filters having a most constant possible group delay, e.g., Bessel filters or series-connected filters having a critical attenuation.

In summary, the method of the present invention enables historical travel-course offsets to be generated in simple fashion, in particular by combining averaging and delay, without necessitating a costly storing of lane data or transformation of such stored data. A rapid result is achieved, since one only has to wait for about half of the time gap up until the result.

To obtain a still further improved method for predicting the path of the vehicle to be controlled, it is also possible for a number of further detection devices for determining the travel-course offsets of objects traveling ahead to be present in the vehicle to be controlled. All results of these detection devices may then be analyzed and weighted. The analysis and weighting may preferably be carried out using a video camera, a preferably satellite-supported navigational system, a set-up for analyzing fixed destinations, or a set-up for determining a collective yaw or rotation rate of the objects driving ahead.

BRIEF DESCRIPTION OF THE DRAWINGS

FIG. 6 shows a block diagram relating to the analysis and weighting of various detection methods used to detect objects moving ahead.

DETAILED DESCRIPTION

Figure 1:
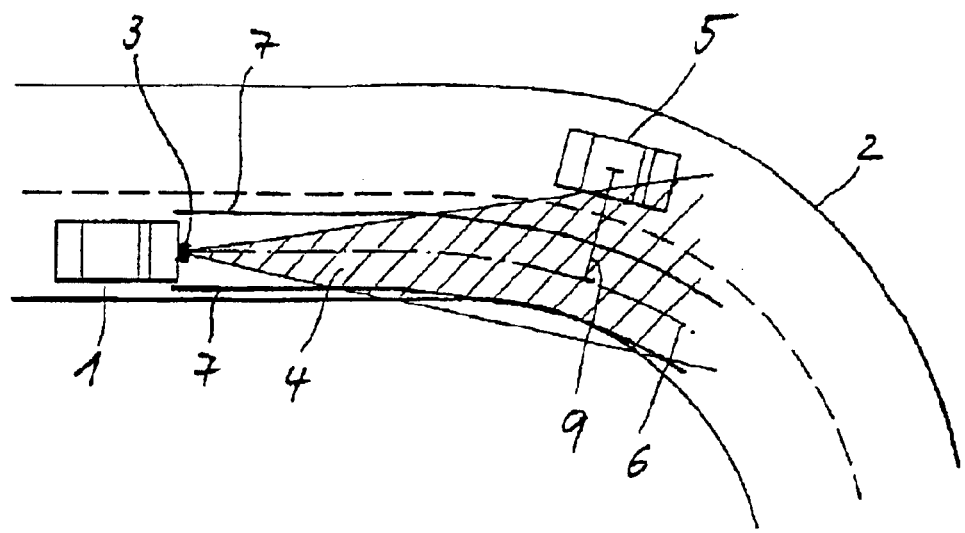
FIG. 1 shows a sketch of a curved roadway path, including a vehicle whose speed is to be controlled, and further objects.

FIG. 1 shows an ACC vehicle 1 to be controlled, which is located on a roadway 2 having a plurality of lanes. Vehicle 1 has, for example, a radar sensor 3 having a radar detection range 4; other detection set-ups are also mountable on vehicle 1, such as video or navigational devices, which may be used to detect roadway 2 or the area surrounding the roadway. Situated on roadway 2 as an object driving ahead is a vehicle 5, in reality, a plurality of such objects being present at various distances and at different speeds.

The ACC system in vehicle 1 includes a control system (not explained in further detail here) for influencing speed, and a plurality of sensors, such as a yaw-rate or rotation-rate sensor, a steering-angle sensor, wheel-speed sensors, or a transversal-acceleration sensor. A dot-dash line 6 represents the future desired travel-course progression, i.e., the travel trajectory of vehicle 1, and the two lines 7 show the future travel-course range or travel corridor. A line segment 9 indicates the lateral or travel-course offset of vehicle 5 driving ahead with respect to the travel course of vehicle 1.

Figure 2:
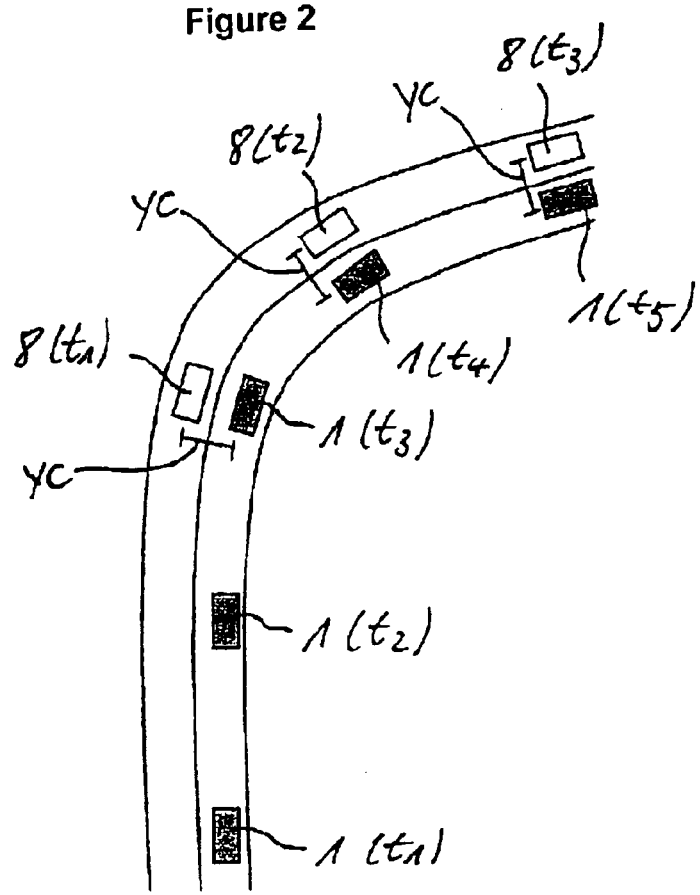
FIG. 2 shows a sketch of a curved roadway path, including a vehicle whose speed is to be controlled, and further objects at various points in time.

The assumption is made in the following, with reference to FIGS. 2 and 3, that, to correct the curvature of travel trajectory 6 of vehicle 1 in light of a curvature to be expected of roadway 2, a historical travel-course offset or lateral offset is used in the calculation.

In accordance with the exemplary embodiment illustrated in the drawing, travel-course offset yc of a vehicle 8 driving ahead is delayed by a predefined time span, and using the then active curvature k, a historical travel-course offset ychist is determined at instants $t_1$, $t_2$, and $t_3$ of travel trajectory 6. In this context, the delay may advantageously be selected such that historical travel-course offset $yc_{hist}$ is defined approximately at half of the distance between vehicle 1 to be controlled and vehicle 5 to be measured.

From this thus delayed value $yv_{hist}$, so-called historical travel-course offset $yc_{hist}$ is now determined, as above, using active curvature k, according to the relation $$yc_{hist} = yv_{hist} - k*d_{hist}^2/2.$$

Figure 3:
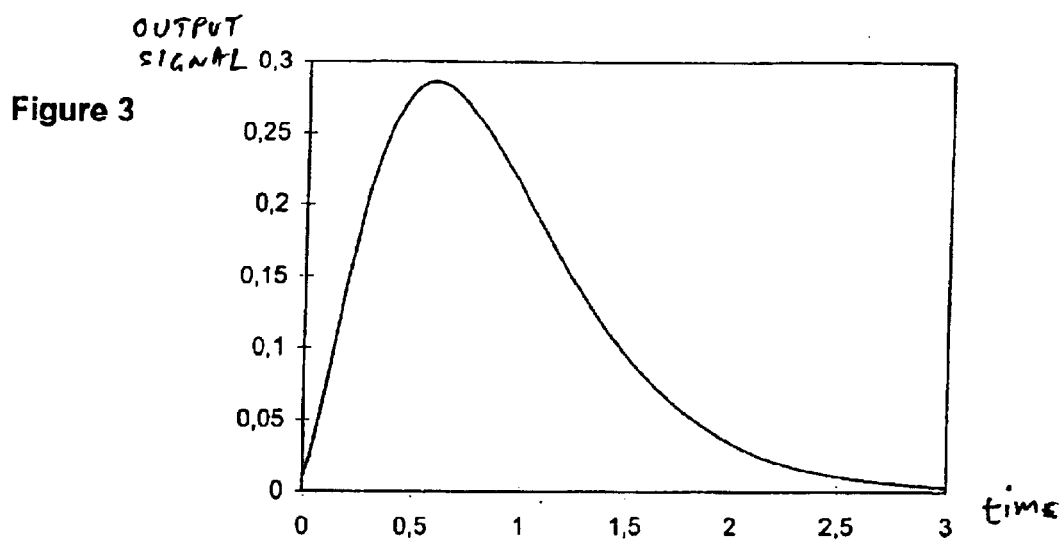
FIG. 3 shows a diagram of the output signal of a delay-producing filter.

FIG. 3 shows a diagram of the output signal of a delay-producing filter. The time is shown in seconds on the horizontal axis, and the characteristic curve of an output signal is shown on the vertical without units/theoretically. The illustrated, exemplary characteristic curve shows a maximum of the output signal in the region of approx. 0.8 seconds. This maximum must be appropriately adapted to the desired delay.

The following describes a method for performing the previously described calculation, with the involvement of historical travel nurse offset $yc_{hist}$ for predicting a travel course. The selected abbreviations represent the common short forms of the corresponding physical quantities used for inputting into a data-processing system. For the sake of simplicity, the trajectory is assumed in this case to be a piece-wise constant parabola The parabola curvature is defined approximately in the middle of the section between object 5 and vehicle 1 (compare FIG. 2). Since the now single trajectory coefficient is defined already when the middle is reached, a delay in the object lateral offsets yv is also only necessary up to the middle. The time delay is achieved, for example, by a triply cascaded low-pass filter (not shown here) having a dynamic time constant Tauy for improving the transient response. Here, the following relations apply:

$$Tauy(t_j)=\text{MIN}(TauyMax(t_j), TauyMax(t_{j-1})+T_{cycle});$$

in the case that a valid measured value exists for the object, otherwise it follows that $$Tauy(t_j)=\text{MAX}(O, TauyMax(t_{j-1})-T_{cycle}/2)$$

where $$Tauy(t_j)\text{MAX}=fTauyd*(d(t_j)/v\text{Ref}(t_j))+fTauyKap*TauKap.$$

The filtering using the three low-pass stages yields a total group delay of $3Tauy(t_j)$. Thus, in three measuring cycles, one obtains the following lateral offsets:

$$yv1(t_j)=(T_{cycle}/Tauy(t_j)*(yv(t_j)-yv1(t_{j-1})),$$

$$yv2(t_j)=(T_{cycle}/Tauy(t_j)*(yv1(t_j)-yv2(t_{j-1})),$$

$$yv3(tj)=(T_{cycle}/Tauy(tj)*(yv2(tj)-yv3(tj-1)).$$

From output value $yv3(t_j)$ of the filter, with the aid of trajectory curvature $k_{Traj}(tj)$ (previously the value=k), the historical lateral offset to the middle of the course may be calculated as follows:

$$ycHist(t_j)=yv3(t_j)-k_{Traj}*(d(t_j)-vr(t_j)*3TauDy(t_j))^2/2.$$

In this case, $vr(t_j)*3Tauy(t_j)$ corrects the active distance to historical reference point $t_j-3Tauy(t_j)$.

As a further characteristic quantity for the quality of the historical lateral offset, quantity ycHistQ is used; it is calculated from angular quality Qalpha (e.g.=1) and from the observation duration for the calculation of the historical lateral offset:

$$ycHistQ(tj)=\text{MIN}(1, ycHistQ(t_{j-1})+Q\text{alpha}*T_{cycle}/TauHist(t_j))$$

respectively, $$TauHist(tj)=fTauHist*(d(t_j)/v_{Ref}(tj),$$

in the case that an object was measured, and a valid travel-course offset is at hand. Quantity fTauHist stands here for the fractional portion of the time gap, starting from which a steady-state performance is assumed. Otherwise, it holds that:

$$ycHistQ(t_j)=\text{MIN}(0, ycHistQ(t_{j-1})-T\text{cycle}/TauHist(t_j)).$$

Since the historical lateral offset is not available in sufficient quality until a relatively long waiting time has elapsed, on the basis of active lateral offset yv and the active travel-course curvature, an active travel-course offset $yc_{Act}$ is determined, which is able to provide a lateral travel-course offset as soon as there is a first measurement of an object:

$$yc_{Act}=yv-yv_{Course}=Yv-d^{2}*k_{Course}/2.$$

Figure 4:
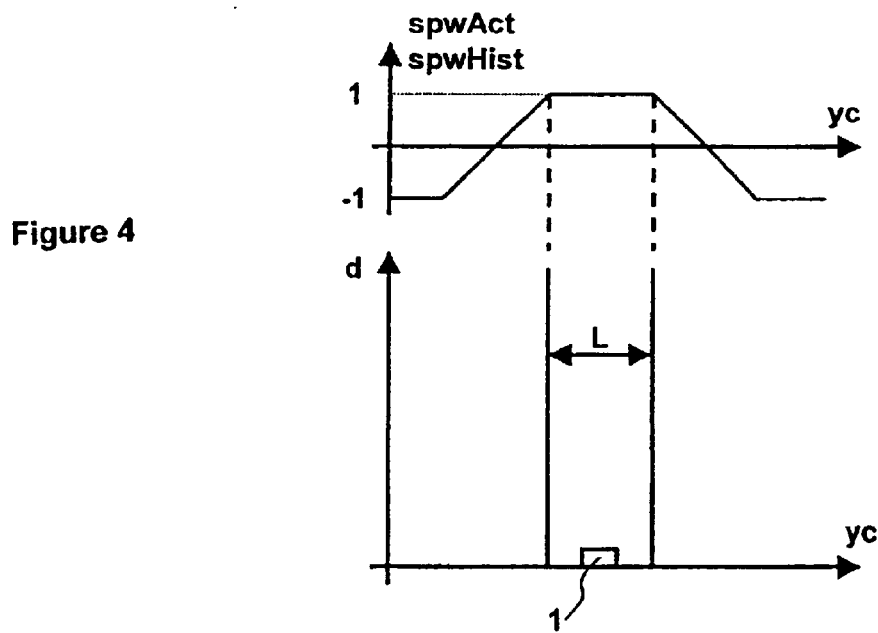
FIG. 4 shows an overview diagram of a lane probability with respect to objects located in a travel corridor.

FIG. 4 is a graphic representation illustrating the lane probability of the measured objects, active lane probability spwAct and historical lane probability spwHist following in parallel, in the same manner, for active lateral offset $yc_{Act}$ and for historical lateral offset $yc_{Hist}$.

As is apparent from FIG. 4, the basis of the previously mentioned lane probability determination is a surface having constant width L. Within this surface, a positive lane probability is assigned, while outside of it, it becomes negative. The highest probability is assigned when yc is situated within the inner surface.

Similarly to the generally known fuzzy logic, the transitional region may be selected to be fuzzy, making it possible to determine a lane probability of −1 to +1. The width of transitional region spw advantageously increases in response to a large distance.

Figure 5:
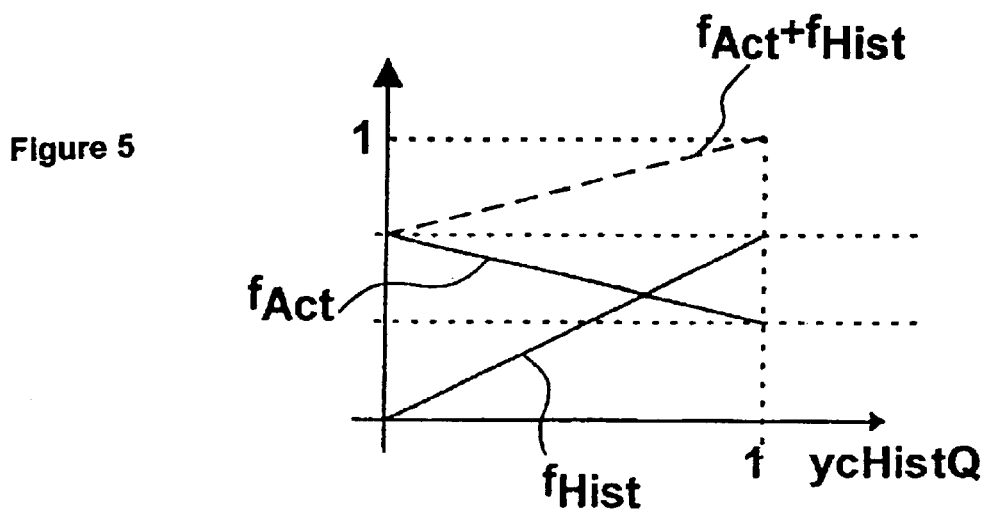
FIG. 5 shows a diagram for assessing the various lane probabilities.

A mixture of the described lane probabilities is shown in a diagram according to FIG. 5. The two lane probabilities spwAct and spwHist are weighted as a function of the quality of historical lateral offset ycHistQ in the time Tauy and mixed to form a new value spw. Weighting factors $f_{Act}$ and $f_{act}+f_{Hist}$ from the diagram according to FIG. 5 are generated as follows, $f_{Hist}$ for ycHistQ is large in the case that the observation time corresponds approximately to TauyMax, $f_{Act}$ may be constant or otherwise determined.

If, in this case, $yc_{Act}$ and $yc_{Hist}$ point to different travel lanes, then the values compensate for one another in accordance with the weightings $f_{Act}$ and $f_{Hist}$. If, on the other hand, they are on the same lane, then they reinforce one another up to the maximum value $f_{Act}+f_{Hist}$.

FIG. 6 shows a block diagram 40, which indicates various possibilities for detecting and evaluating object in travel-course progression k of an ACC vehicle, which may also be used in different combinations, individually or together. In left branch 41, a calculation is shown of a future travel-course progression by adding the vehicle's own trajectory from the vehicle's own yaw rate, to a collective yaw rate in a block 42. In a block 43, by consulting the active object data, a decision may now be made as to whether a detected vehicle is located in the vehicle's own calculated travel corridor and, therefore, comes under consideration as an object to which the vehicle's own seed should be adapted. If this is answered in the affirmative, the actual control may he carried out in a control system 44.

For this, in a parallel branch 45, it is intended for a video system 46 to be present, which likewise is able to define the vehicle's own travel corridor and detect an object driving ahead as a control object.

In a further branch 47, a navigational system 48 is provided, which, with knowledge of the vehicle's own position and, under consideration of existing map material, is able to effect the same control mechanisms as previously described.

In a further branch 49, in a module 50, a travel course prediction may be made for ACC vehicle 1, which, in the calculation, considers the previously described, historical, lateral offset between ACC vehicle 1 and a detected object (vehicle 5, 8).

In another parallel branch 51, in a module 52, a travel course determination may also be made using a travel-course offset ascertained by interpreting the position of fixed destinations, for example at the edge of the roadway.

In actual control system 44, by analyzing the results from the calculations of individual branches 41, 45, 47, 49, and 51, a final decision may now be made with respect to the selection of the vehicle driving ahead, if indicated, including a weighting of the individual results, to which the ACC vehicle adapts its speed.

What is claimed is:

1. A method for controlling a speed of a vehicle, comprising the steps of:
   in the vehicle to be controlled, measuring one of a yaw rate and a rotation rate to determine a curvature of a trajectory of the vehicle;
   causing one of a proximity sensor and a position sensor to detect one of at least one vehicle traveling ahead and at least some other object within a sensing range, with regard to an offset from a travel course of the vehicle to be controlled;
   determining a travel-course offset of a vehicle driving ahead in preset measuring cycles;

delaying the travel-course offset of the vehicle traveling ahead by a predefined time lag;

ascertaining a historical travel-course offset in accordance with a then active curvature of the trajectory of the vehicle to be controlled; and controlling the speed of the vehicle in accordance with the travel-course offset results;

wherein the historical travel-course offset is determined in accordance with the relation $yc_{hist}=yv_{hist}-k*d_{hist}^2/2$, $d_{hist}$ likewise being one of generated and estimated as a historical distance between the vehicle to be controlled and the vehicle driving ahead on the basis of a delay.

2. The method according to claim 1, further comprising the step of:

for an active travel-course offset and the historical travel-course offset, determining a lane probability of the vehicle driving ahead for at least one of an own lane and adjacent lanes of the vehicle to be controlled.

3. The method according to claim 1, further comprising the steps of:

in the vehicle to be controlled, providing a number of further detection devices for measuring positions of the vehicle ahead; and to select an object driving ahead as a vehicle to which a speed of the vehicle to be controlled is to be adapted, evaluating and weighting all results from the further detection devices.

4. The method according to claim 3, wherein:

the evaluation and weighting are carried out using one of a video camera, a satellite-supported navigational system, a system for analyzing fixed destinations, and a system for determining a collective yaw rate of objects driving ahead.

5. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

determining a travel-course offset of a vehicle driving ahead in preset measuring cycles;

delaying the travel-course offset of the vehicle traveling ahead by a predefined time lag;

ascertaining a historical travel-course offset in accordance with a then active curvature of the trajectory of the vehicle to be controlled;

controlling the speed of the vehicle in accordance with the travel-course offset results; and supplementing a time span until a maximum value $t_{hist}$ is reached by a component that increases with a duration of observation to form $t_{hist/dyn}$;

wherein the predefined time lag is selected such that the historical travel-course offset is determined after approximately half of a distance between the vehicle to be controlled and the vehicle driving ahead.

6. The method according to claim 5, wherein:

the historical travel-course offset is determined in accordance with the relation $yc_{hist}=yv_{hist}-k*d_{hist}^2/2$, $d_{hist}$ likewise being one of generated and estimated as a historical distance between the vehicle to be controlled and the vehicle driving ahead on the basis of a delay.

7. The method according to claim 6, wherein:

the historical distance is estimated according to the relation $d_{hist}=d_{active}-vr*t_{hist}$.

8. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

determining a travel-course offset of a vehicle driving ahead in preset measuring cycles;

delaying the travel-course offset of the vehicle traveling ahead by a predefined time lag;

ascertaining a historical travel-course offset in accordance with a then active curvature of the trajectory of the vehicle to be controlled;

controlling the speed of the vehicle in accordance with the travel-course offset results; and at any one time, delaying by a preset value an instantaneous value of curvature of the trajectory of the vehicle to be controlled, the delay being considered as well in the determination of the historical travel-course offset.

9. The method according to claim 8, wherein:

the predefined time lag is selected such that the historical travel-course offset is determined after approximately half of a distance between the vehicle to be controlled and the vehicle driving ahead.

10. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

determining a travel-course offset of a vehicle driving ahead in preset measuring cycles;

delaying the travel-course offset of the vehicle traveling ahead by a predefined time lag;

ascertaining a historical travel-course offset in accordance with a then active curvature of the trajectory of the vehicle to be controlled;

controlling the speed of the vehicle in accordance with the travel-course offset results;

for an active travel-course offset and the historical travel-course offset, determining a lane probability of the vehicle driving ahead for at least one of an own lane and adjacent lanes of the vehicle to be controlled; and mixing two lane probabilities as a function of a quality of one of the historical travel-course offset to form a new value.

11. A method for controlling a speed of a vehicle, comprising the steps of:

in the vehicle to be controlled, measuring one of a yaw rate and a rotation rate to determine a curvature of a trajectory of the vehicle;

causing one of a proximity sensor and a position sensor to detect one of at least one vehicle traveling ahead and at least some other object within a sensing range, with regard to an offset from a travel course of the vehicle to be controlled;

determining a travel-course offset of a vehicle driving ahead in preset measuring cycles;

delaying the travel-course offset of the vehicle traveling ahead by a predefined time lag;

ascertaining a historical travel-course offset in accordance with a then active curvature of the trajectory of the vehicle to be controlled; and controlling the speed of the vehicle in accordance with the travel-course offset results;

wherein:

the predefined time lag is selected such that the historical travel-course offset is determined after approximately half of a distance between the vehicle to be controlled and the vehicle driving ahead; and the historical travel-course offset is determined in accordance with the relation $yc_{hist}=yv_{hist}-k*d_{hist}^2/2$, $d_{hist}$ likewise being one of generated and estimated as a historical distance between the vehicle to be controlled and the vehicle driving ahead on the basis of a delay.

12. The method according to claim 11, wherein:

the historical distance is estimated according to the relation $d_{hist}=d_{active}-vr*t_{hist}$.

13. The method according to claim 12, further comprising the step of:

supplementing a time span until a maximum value $t_{hist}$, is reached by a component that increases with a duration of observation to form $t_{hist/dyn}$.

14. The method according to claim 11, further comprising the step of:

supplementing a time span until a maximum value $t_{hist}$ is reached by a component that increases with a duration of observation to form $t_{hist/dyn}$.

15. The method according to claim 11, further comprising the step of:

at any one time, delaying by a preset value an instantaneous value of curvature of the trajectory of the vehicle to be controlled, the delay being considered as well in the determination of the historical travel-course offset.

16. The method according to claim 15, further comprising the step of:

for an active travel-course offset and the historical travel-course offset, determining a lane probability of the vehicle driving ahead for at least one of an own lane and adjacent lanes of the vehicle to be controlled.

17. The method according to claim 16, further comprising the step of:

mixing two lane probabilities as a function of a quality of one of the historical travel-course offset to form a new value.

18. The method according to claim 11, further comprising the step of:

for an active travel-course offset and the historical travel-course offset, determining a lane probability of the vehicle driving ahead for at least one of an own lane and adjacent lanes of the vehicle to be controlled.

19. The method according to claim 18, further comprising the step of:

mixing two lane probabilities as a function of a quality of one of the historical travel-course offset to form a new value.

20. The method according to claim 11, further comprising the steps of:

in the vehicle to be controlled, providing a number of further detection devices for measured position of the vehicle ahead; and to select an object driving ahead as a vehicle to which a speed of the vehicle to be controlled is to be adapted, evaluating and weighting all results from the further detection devices;

wherein the evaluation and weighting are carried out using one of a video camera, a satellite-supported navigational system, a system for analyzing fixed destinations, and a system for determining a collective yaw rate of objects driving ahead.

* * * * *

UNITED STATES PATENT AND TRADEMARK OFFICE
CERTIFICATE OF CORRECTION

PATENT NO. : 6,763,904 B2
DATED : July 20, 2004
INVENTOR(S) : Hermann Winner et al.

It is certified that error appears in the above-identified patent and that said Letters Patent is hereby corrected as shown below:

Title page,
Item [75], ABSTRACT,
Line 13, change from "offset is ascertained, one is able" to -- offset is ascertained and one is able --

Column 2,
Line 11, change "offset ye" to -- offset yc --

Column 3,
Lines 2-3, change "time span thist" to -- time span $t_{hist}$ --

Column 4,
Line 33, change "ychist is determined" to -- $yc_{hist}$ is determined --

Column 5,
Line 18, change "…=($T_{cycle}$/T$auy(tj)$*$(yv2(tj)$-$yv3(tj$-1))." to -- …=($T_{cycle}$/T$auy(t_j)$*$(yv2(t_j)$-$_{yv}3(t_j$-1)). --
Line 20, change "curvature $K_{Traj}$ (tj)" to -- curvature $K_{traj}(t_j)$ --
Line 34, change "ycHistQ(tj)…" to -- ycHistQ($t_j$)… --
Line 37, change "TauHist(tj)…" to -- TauHist($t_j$)… --

Column 6,
Line 50, change "41, 45, 47, 49, and 51." to -- 41, 45, 47, 49 and 51 --

Column 9,
Line 32, change "value $t_{hist}$," to -- value $t_{hist}$ --

UNITED STATES PATENT AND TRADEMARK OFFICE
CERTIFICATE OF CORRECTION

PATENT NO. : 6,763,904 B2
DATED : July 20, 2004
INVENTOR(S) : Hermann Winner et al.

It is certified that error appears in the above-identified patent and that said Letters Patent is hereby corrected as shown below:

Column 10,
Line 31, change "for measured position" to -- for measuring position --

Signed and Sealed this

Twenty-fourth Day of May, 2005

JON W. DUDAS
*Director of the United States Patent and Trademark Office*